United States Patent [19]
Epstein et al.

[11] Patent Number: 5,039,583
[45] Date of Patent: Aug. 13, 1991

[54] ERASABLE OPTICAL INFORMATION STORAGE SYSTEM

[75] Inventors: Arthur J. Epstein, Bexley; John M. Ginder, Columbus; Richard P. McCall, Upper Arlington, all of Ohio

[73] Assignee: Ohio State University Research Foundation, Columbus, Ohio

[21] Appl. No.: 305,872

[22] Filed: Feb. 2, 1989

[51] Int. Cl.$^5$ .......................... G03C 3/00; G03C 5/00
[52] U.S. Cl. .................................... 430/19; 430/495; 430/270; 430/945; 430/21; 346/135.1; 369/100; 369/288
[58] Field of Search .................. 430/19, 495, 270, 945, 430/21; 528/422, 210, 230; 346/21; 369/100, 288

[56] References Cited

U.S. PATENT DOCUMENTS

| | | | |
|---|---|---|---|
| 4,304,465 | 12/1981 | Diaz | 350/357 |
| 4,571,029 | 2/1986 | Skotheim et al. | 350/357 |
| 4,586,792 | 5/1986 | Yang et al. | 350/357 |
| 4,749,260 | 6/1988 | Yang et al. | 350/357 |
| 4,860,273 | 8/1989 | Sawano et al. | 369/100 |
| 4,860,277 | 8/1989 | Wisseroth et al. | 369/126 |

OTHER PUBLICATIONS

MacDiarmid et al., Polyaniline: *New Concept in Conducting Polymers*; Synth. Met. 18, 285 (1987).
Paul et al., *Resistance of Polyaniline Films as a Function of Electrochemical Potential and the Fabrication of Polyaniline-Based Microelectric Devices*; J. Phys. Chem. 89, 1441 (1985).
J. M. Ginder, A. J. Epstein, A. G. MacDiarmid *Electronic Phenomena in Polyaniline*, ICSM (1988).
M. J. Rice, E. J. Mele, Phys. Rev. Lett., 49, 1455 (1982).
J. L. Bredas, B. Themans, J. G. Fripiat, J. M. Andre, and R. R. Chance, Phys. Rev. Lett., B29, 6761 (1984).
E. Paul, et al., *J. Phys. Chem.*, 89, 1441–1447 (1985).
J. C. Chiang and A. G. MacDiarmid, Synth. Met., 13, 193 (1986).
J. P. Herriau, J. P. Huignard, *Appl. Phys. Lett.*, 49, (18), 1140, (1986).
J. M. Ginder, A. F. Richter, A. G. MacDiarmid and A. J. Epstein, *Solid State Commun.*, 63, 97 (1987).
A. J. Epstein, J. M. Ginder, F. Zuo, R. W. Bigelow, H. S. Woo, D. B. Tanner, A. F. Tichter, W. S. Huang, and A. G. MacDiarmid, Synth. Met., 18, 303 (1987).
S. Stafstrom, J. L. Bredas, A. J. Epstein, H. S. Woo, D. B. Tanner, W.S. Huang, and A.G. MacDiarmid, *Phys. Rev. Lett.*, 59, 1464 (1987).
J. Hecht, Laser & Optronics, 77 Sep., 1987.
H. Y. Choi, E. J. Mele, *Phys. Rev. Lett.*, 59, 2188 (1987).
A. J. Epstein, J. M. Ginder, M. G. Roe, T. L. Gustafson, M. Angelopoulos, and A. G. MacDiarmid, *Mat. Res. Soc. Symp. Proc.*, 109, 313 (1988).
M. G. Roe, J. M. Ginder, P. E. Wigen, A. J. Epstein, M. Angelopoulos and A. G. MacDiarmid, *Phys. Rev. Lett.*, 60, (26), 2789 (1988).
R. P. McCall, M. G. Roe, J. M. Ginder, T. Kusumoto, A. J. Epstein, G. E. Asturias, E. M. Scherr and A. G. MacDiarmid, Proceedings ICSM (1988).
J. Feinberg, Physics Today, Oct., 1988.

*Primary Examiner*—Charles L. Bowers, Jr.
*Assistant Examiner*—Ashley I. Pezzner
*Attorney, Agent, or Firm*—Emch, Schaffer, Schaub & Porcello

[57] ABSTRACT

An erasable optical information storage apparatus is disclosed and the process for making such an apparatus is disclosed. The apparatus utilizes the photoabsorption and electrochemical absorption characteristics of the polyaniline class to polymers to provide an easily accessible and erasable information storage unit.

15 Claims, 9 Drawing Sheets

ERASABLE OPTICAL INFORMATION STORAGE SYSTEM

BACKGROUND OF THE INVENTION

The present invention relates to a broad class of processible stable polymers which are applied to the creation of a high density erasable data storage member intended for use in information storage and processing applications. The polymers in use for such applications are of the polyaniline class. Polyaniline is a family of polymers whose electronic and optical properties are manipulated through a control which directs variations of the number of electrons and protons on the polyaniline polymer chain.

This invention is related to the invention disclosed in co-pending application Ser. No. 193,964, which was filed on May 13, 1988. That application discusses how the chemical and physical properties of the polyaniline class of polymers are modified by chemical and electrical methods such as protonation and oxidative doping. As such, polyaniline and its derivatives are successfully applied to the absorption of electromagnetic radiation and the modulation of electromagnetic beams. The technologies discussing the chemical and electrical methods for modifying the chemical and physical properties of polyaniline are incorporated by reference herein as background relating to the present invention.

Polyaniline is a family of polymers that has been under intensive study recently because the electronic and optical properties of the polymers can be modified through variations of either the number of protons, the number of electrons, or both. The polyaniline polymer can occur in several general forms including the so-called reduced form (leucoemeraldine base), possessing the general formula

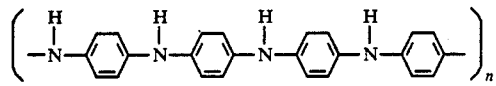

the partially oxidized so-called emeraldine base form, of the general formula

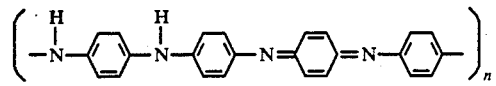

and the fully oxidized so-called pernigraniline form, of the general formula

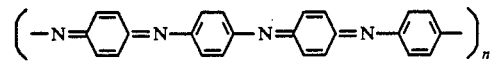

In practice, polyaniline generally exists as a mixture of the several forms with a general formula (I) of

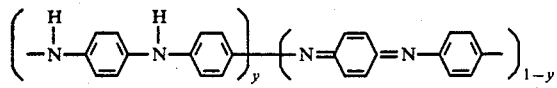

When $0 < y < 1$ the polyaniline polymers are referred to as poly(paraphenyleneamineimines) in which the oxidation state of the polymer continuously increases with decreasing value of y. The fully reduced poly(paraphenyleneamine) is referred to as leucoemeraldine, having the repeating units indicated above corresponding to value of $y=1$. The fully oxidized poly(paraphenyleneimine) is referred to as pernigraniline, of repeat unit shown above corresponds to a value of $y=0$. The partly oxidized poly(paraphenyleneimine) with y in the range of greater than or equal to 0.35 and less than or equal to 0.65 is termed emeraldine, though the name emeraldine is often focused on y equal to or approximately 0.5 composition. Thus, the terms "leucoemeraldine", "emeraldine" and "pernigraniline" refer to different oxidation states of polyaniline. Each oxidation state can exist in the form of its base or in its protonated form (salt) by treatment of the base with an acid.

The use of the terms "protonated" and "partially protonated" herein includes, but is not limited to, the addition of hydrogen ions to the polymer by, for example, a protonic acid, such as mineral and/or organic acids. The use of the terms "protonated" and "partially protonated" herein also includes pseudoprotonation, wherein there is introduced into the polymer a cation such as, but not limited to, a metal ion, $M^+$. For example, "50%" protonation of emeraldine leads formally to a composition of the formula

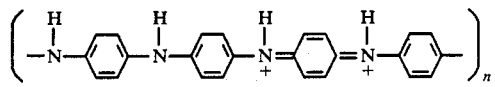

which may be rewritten as

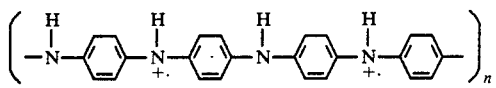

Formally, the degree of protonation may vary from a ratio of $[H^+]/[-N=]=0$ to a ratio of $[H^+]/[-N=]=1$. Protonation or partial protonation at the amine (—NH—) sites may also occur.

The electrical and optical properties of the polyaniline polymers vary with the different oxidation states and the different forms. For example, the leucoemeraldine base, emeraldine base and pernigraniline base forms of the polymer are electrically insulating while the emeraldine salt (protonated) form of the polymer is conductive. Protonation of emeraldine base by aqueous HCl (1M HCl) to produce the corresponding salt brings about an increase in electrical conductivity of approximately $10^{10}$; deprotonation occurs reversibly in aqueous base or upon exposure to vapor of, for example, ammonia. The emeraldine salt form can also be achieved by electrochemical oxidation of the leucoemeraldine base polymer or electrochemical reduction of the pernigraniline base polymer in the presence of an electrolyte of the appropriate pH. The rate of the electrochemical reversibility is very rapid; solid polyaniline can be switched between conducting, protonated and nonconducting states at a rate of approximately $10^5$ Hz for electrolyte in solution and even faster with solid electrolytes. [E. Paul, et al., *J. Phys. Chem.*, 89, 1441-1447 (1985)]. The rate of electrochemical reversibility is also controlled by the thickness of the film, thin films exhibiting a faster rate than thick films. Polyaniline can then be switched from insulating to conducting form as a function of protonation level (controlled by ion insertion) and oxidation state (controlled by electrochemical potential). Thus, polyaniline can be turned "on" by either a negative or a positive shift of the electrochemical potential, because polyaniline films are essentially insulating at sufficiently negative (approximately 0.00 V vs. SCE) or positive (+0.7 V vs. SCE) electrochemical potentials. Polyaniline can also then be turned "off" by an opposite shift of the electrochemical potential.

Polymers have also recently been under investigation because of the ability to alter their optical properties as the result of exposure to optical excitation. The photoinduced absorption spectrum of polyaniline differs substantially from other polymers such as polyacetylene, polythiophene, polypyrrole and polydiacetylene in several important aspects. First, polyaniline is not charge conjugation symmetric; that is, the Fermi level and band gap are not formed in the center of the $\pi$ band, so that the valence and conduction bands are very asymmetric. [S. Stafstrom, J. L. Bredas, A. J. Epstein, H. S. Woo, D. B. Tanner, W. S. Huang, and A. G. MacDiarmid, Phys. Rev. Lett. 59, 1464 (1987)]. Consequently, the energy level positions of doping induced and photoinduced excitations differ from those in charge-conjugation-symmetric polymers such as polyacetylene and polythiophene. Second, both carbon rings and nitrogen atoms are within the conjugation path forming a generalized "A-B" polymer, unlike polypyrrole and polythiophene, whose heteroatoms do not contribute significantly to $\pi$ band formation. [M. J. Rice and E. J. Mele, Phys. Rev. Lett 49, 1455 (1982); J. L. Bredas, B. Themans, J. G. Fripiat, J. M. Andre and R. R. Chance, Phys. Rev. B29, 6761 (1984)]. Third, the emeraldine base form of polyaniline can be converted from an insulating to a metallic state if protons are added to the —N= state sites while the number of electrons on the chain is held constant. [J. C. Chaing and A. G. Mac Diarmid, Synth. Met. 13, 193 (1986)]. For example, exposure of emeraldine base to a protonic acid such as HCl causes a transformation to the emeraldine salt form of polyaniline. The emeraldine salt form of polyaniline exhibits metallic properties which are due to the formation of a polaron lattice in the material. [J. M. Ginder, A. F. Richter, A. G. MacDiarmid, and A. J. Epstein, Solid State Commun., 63, 97 (1987); A. J. Epstein, J. M. Finder, F. Zuo, R. W. Bigelow. H. S. Woo, D. B. Tanner, A. F. Richter, W. S. Huang and A. G. MacDiarmid, Synth. Met. 18, 303 (1987); H. Y. Choi, and E. J. Mele, Phys. Rev. Lett. 59, 2188 (1987)].

These distinct photoinduced properties of the polyaniline class of polymers provides a unique opportunity for the application of such polymers to technologies outside of the previously accepted variety of applications. One such unique application is the erasable optical information storage technology of this invention.

SUMMARY OF THE INVENTION

The optical information storage process of the present invention provides for erasable high density optical data storage which can be used in information storage and processing applications. Current technologies are generally limited to write-once technologies which do not permit nondestructive erasure of information once written. The few erasable optical storage technologies currently available have problems associated with them such as the need for operation at extreme cold to reduce the effects of exciton bleaching in spectral hole burning, or they have relatively weak effects such as chalcogenide lattice transformations that also require expensive fabrication technologies.

Current technology has provided commercial optical disk drives, but their viability has been deterred by problems surrounding the user's desire for erasability. The use of erasable media in an optical disk presents problems in that the media must be encapsulated to resist oxidation and also must be made resistant to temperature-induced degradation. To date, investigations into erasable media have relied upon two different principles: changes in the crystalline phase of a reflective material and magneto-optics.

Data recording on phase-change media relies on switching a thin film coating on a disk between crystalline and amorphous phases with different reflectivity. Stability and reversability of the data storage however have remained major problem areas.

Magneto-optical recording is a hybrid approach, using laser light to read and write data encoded magnetically in an alloy that both transmits light and holds a magnetic field. This approach involves major design complexities when erasure is desired. The magneto-optic media must be heated in the presence of a magnetic field with polarity opposite that of the write head. This usually requires a separate erase head, thus slowing down the drive operation.

The present invention provides a powerful novel information storage process based upon the photoexcited optical transformations resulting from the optical absorptions of the polyaniline class of polymers.

This application and the description of the preferred embodiment will recite information relating to the emeraldine base formulation of polyaniline. This limitation is solely for the purposes of clarity and description and should not be presumed to be limiting on the scope of the present invention which is directed toward the entire class of the polymer-polyaniline.

In a specific formulation, a film of the polyaniline material is prepared in the emeraldine base form. Holding the sample at a reduced temperature, preferrably below 100 Kelvin, the sample is exposed to a writing beam having a specified photon frequency and intensity designed to modify the optical absorption of the polyaniline film. A reading beam having a second specified frequency and intensity can then be applied to the sample. The level of the optical signal of the reading beam will correlate with the altered optical absorption spectrum of the sample polyaniline. Thus, for example, if the reading beam encounters a new photoinduced energy peak in the sample it will determine the presence of a data bit stored in a given region of the sample so interrogated. The emeraldine base storage medium is stable as long as it is maintained at low temperatures. The entire storage medium may be erased by cycling the material up to room temperature (greater than or equal to 250 K.).

The present invention provides for the chemical or electrical erasure of the stored information in bit-wise manner by temporary conversion of a specified bit of the conducting form of the polyaniline film. For instance, electrochemical conversion is achieved in a compact solid-state sandwich cell incorporating a solid electrolyte. This electrochemical conversion provides the ability to electrically erase or correct individual bits written optically within the polymer sample.

The present invention also provides for the bit-wise or total erasure of the stored information. For example, application of an intense beam having a wavelength of approximately 1.2 microns such as that available from diode lasers and incandescent sources, to a storage medium composed of emeraldine base film will enable the bit-wise erasure of a bit of information written into the medium using approximately 500 nm light. The total erasure of the stored information can be obtained by exposure of the entire storage medium to light of the appropriate wavelength.

Further, the present invention provides for the "layering" of information stored. As the intensity of the photoinduced (write beam produced) change in absorption is proportional to the intensity of the write beam, discrimination of the amount of photoinduced optical absorption by the read beam enables more than one bit (0,1) to be written at a single bit location. For example, discrimination of two different levels of photoinduced optical absorption squares the total number of bits that may be stored: discrimination of three different photoinduced absorption levels cubes the number of bits that may be stored, etc.

Finally, the present invention and the polyaniline materials described herein may also be used to provide a medium for hologram fixing process as done for example in photorefractive $Bi_{12}SiO_{20}$ (J. P. Herriau and J. P. Huignard, Appl. Phys. Lett. 49, 1140 (1986) and $BaTiO_3$ (J. Feinberg, Physics Today, 41 (10) 46 (1988)). This technique allows for storage of information in a form of photoinduced fixed gratings within the polyaniline material and formation of holographic images.

DETAILED DESCRIPTION OF THE PREFERRED EMBODIMENT OF THE PRESENT INVENTION

The present invention takes advantage of a unique photoabsorption property of the polyaniline class of polymers. The electronic and optical properties of polyaniline can be controlled through optical and/or electrochemical input. These optical and electrical changes of polyaniline can be maintained over long periods of time and are dependent upon the maintenance of proper temperatures, as well as internal chemical alterations of the polymer chain. These internal chemical alterations primarily include but are not necessarily limited to judicious choices of N or ring substituents, the formation of excitons and massive polarons, and pinning as a result of electrochemical doping. For instance, the photoinduced spectrum of the emeraldine base form of polyaniline, unlike other polymers, contains subgap photoinduced bleaching and photoinduced absorption. The existence of the bleaching peak is consistent a model of optically excited localized molecular excitons in the emeraldine base polymer. However, the energies of the three photoinduced absorption peaks and an associated interband bleaching are in agreement with the photogeneration of polaron pairs. The excitons have a decay dynamic which is weakly dependent on temperature. The polarons have been found to have an extreme temperature dependence wherein the decay rate of the long-lived polaron fraction can be held practically negligible if the proper temperatures are maintained.

Figure 1:
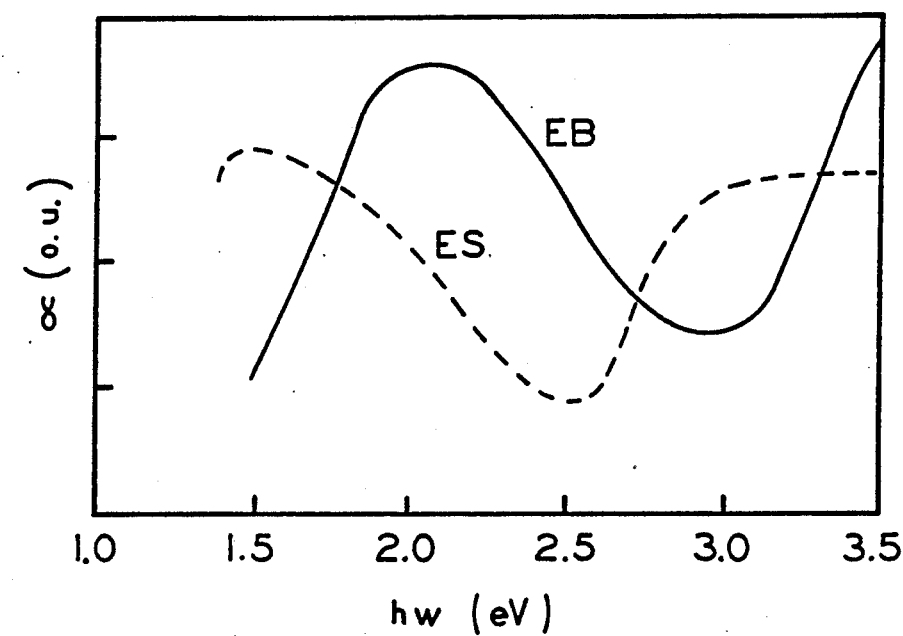
FIG. 1 shows the optical absorption spectra of emeraldine base and emeraldine salt.

Referring now to FIG. 1, it is seen that the optical absorption spectrum of emeraldine base changes when it is converted to emeraldine salt. Emeraldine base has large absorptions at 2 eV and 3.5 eV. The 3.5 eV absorption corresponds to the band gap transition in emeraldine base while the 2 eV absorption is an exciton transition associated with the quinoid rings. Emeraldine salt also possesses a band gap of about 3.5 eV, together with two intragap transitions at 1.5 and 3.0 eV arising from the lattice of positive polarons.

Figure 2:
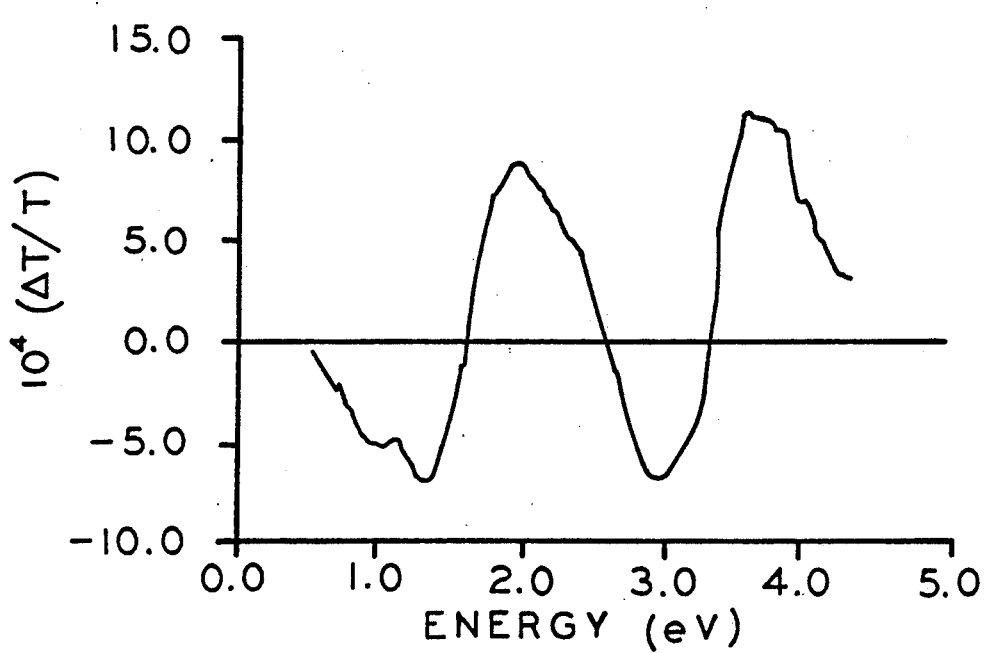
FIG. 2 shows the steady-state photoinduced absorption spectrum of emeraldine base measured at 15 K.

The steady-state photoinduced absorption spectrum of emeraldine base at a substrate temperature of 15 K. is shown in FIG. 2. Five photoinduced features—two photoinduced bleachings and 3 photoinduced absorptions are clearly apparent in the measured photon energy range of 0.5 to 4.5 eV. The photoinduced absorption spectrum of FIG. 2 has been further studied by varying the laser intensity and chopper frequency. The results of these studies are summarized in Table I.

TABLE I

Summary of the laser intensity and chopper frequency dependence (at 15 and 300 K) of each of the five photoinduced features of EB. PA = photoinduced absorption and PB = photoinduced bleaching.

| Photon Energy (eV) | Type | Intensity Dependence | Frequency Dep. (300 K) | Frequency Dep. (15 K) |
|---|---|---|---|---|
| 0.9 | PA | $\sqrt{I}$ | f-0.17 | f-0.19 |
| 1.4 | PA | $\sqrt{I}$ | f-0.31 | f-0.44 |
| 1.8 | PB | I | f-0.47 | f-0.39 |
| 3.0 | PA | $\sqrt{I}$ | f-0.31 | f-0.44 |
| 3.7 | PB | $\sqrt{I}$ | f-0.56 | f-.41 |

Using FIG. 2 and the information in Table I, it is clear that the 1.8 eV induced bleaching is the result of a creation of excitons by the laser. The presence of excitons is confirmed by the measured laser intensity dependence, which is that expected for exciton recombination. The induced absorptions at 1.4 and 3 eV correspond with the polaron absorptions in emeraldine salt. Thus, they are assigned to the photocreation of polaron pairs in emeraldine base. These results are consistent with the observed square root laser intensity dependence. The induced bleaching at 3.7 eV is caused by the removal of states from the conduction and valence bands that occurs when polarons are formed. Thus, it too varies as the square root of the laser intensity. These photoexcited polarons have low mobility and a very large polaron mass thereby providing lengthened decay times of the photoinduced changes in the emeraldine optical absorption spectrum.

Figure 3:
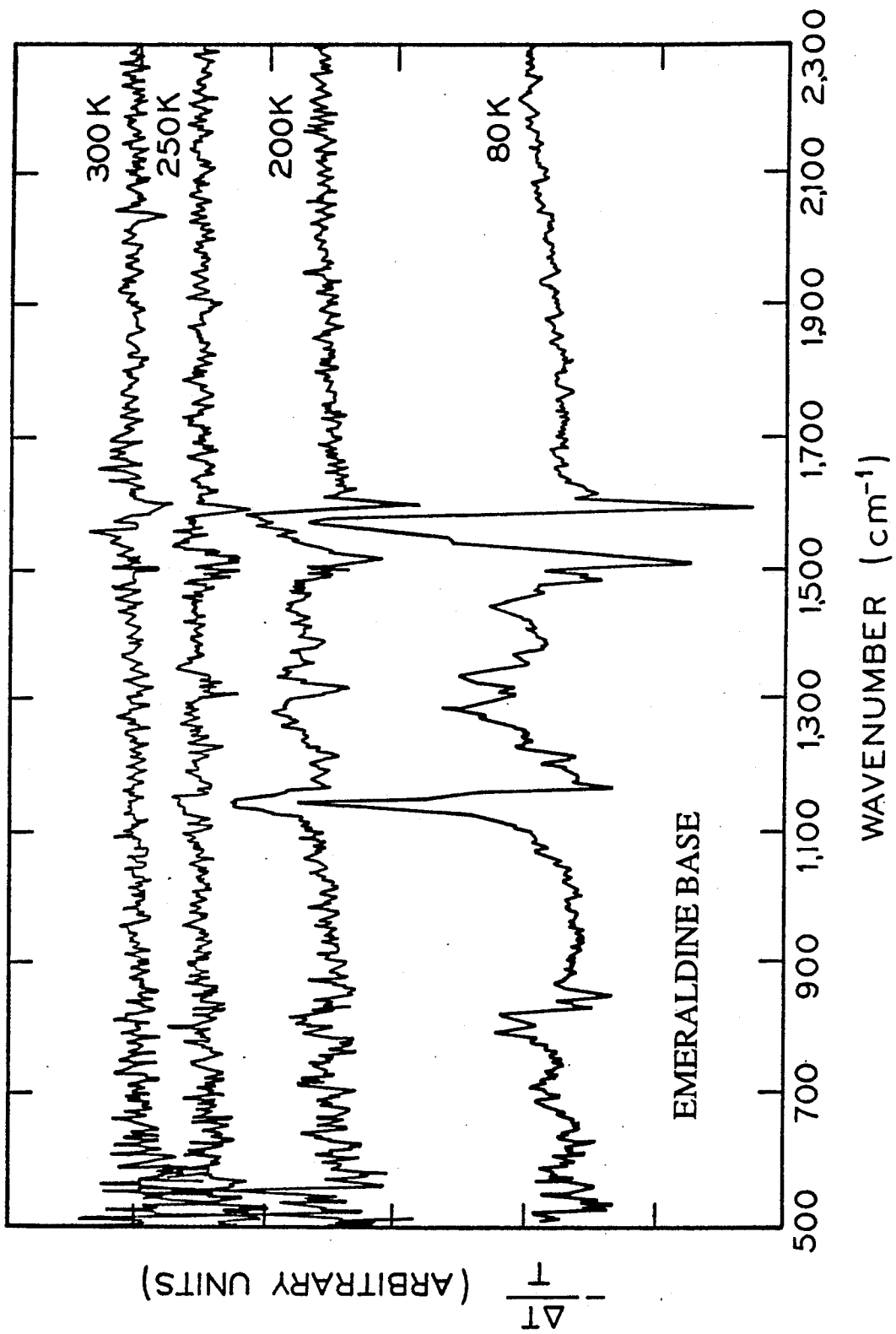
FIG. 3 shows the temperature dependence of the photoinduced infrared absorption of emeraldine base measured for 10 seconds after 20 seconds exposure of the sample to a 488 nm argon-ion laser write beam.

FIG. 3 shows the photoinduced spectrum in the range of 500 to 2300 cm$^{-1}$ at a sample temperature of 80 K., 200 K., 250 K. and 300 K. The results show strong absorptions at 1144 cm$^{-1}$ and 1576 cm$^{-1}$ and bleachings at 1510 cm$^{-1}$ and 1599 cm$^{-1}$ indicating the breaking of symmetry and the coupling of the polaron charge to the underlying lattice. The photoinduced features at 1510 cm$^{-1}$ and 1599 cm$^{-1}$ reflect the sensitivity of the normal modes of the para-disubstituted benzene rings to the electronic configuration within each ring. The bleachings at 1510 cm$^{-1}$ and 1599 cm$^{-1}$ indicate a small decrease in the number of benzenoid and quinoid structures in emeraldine base upon photoexcitation. The growth of photoinduced absorption at 1576 cm$^{-1}$, with a shoulder at 1550 cm$^{-1}$, directly reflects the formation of new ring configurations of positive and negative charged polarons. The photoinduced signal is long lived, having lifetimes greater than 2 hours at 80 K. Thus, it is evident that the long life of the polarons is due to inhibited ring rotation at lower temperatures.

The large gap ($\sim 3.8$ eV) in emeraldine base may be thought of as originating primarily as a result of the $\pi - \pi^*$ transitions involving the molecular orbitals associated with the benzene-like groups. Assuming the amplitude mode formalism [E. Ehrenfreund, Z. Vardeny, O. Brafman and B. Horovitz, Phys. Rev. B, 36, 1535 (1987)] is valid for emeraldine base, despite the presence of this large extrinsic gap, the polaron mass $M_{pol}$ can be calculated and the strength of the polaron pinning can also be calculated for emeraldine base. Taking the two strongest features at 1144 cm$^{-1}$ and 1576 cm$^{-1}$ to correspond to resonant Raman lines at 1188 cm$^{-1}$ and 1623 cm$^{-1}$, the calculations predict a pinning parameter of $\sim 0.8$ for emeraldine base. This value is substantially larger than the pinning parameters reported for polythiophene ($\sim 0.31$) and polyacetylene ($\sim 0.06$), indicating strong polaron pinning in emeraldine base. Based on the band effective mass for emeraldine base, ($M^* \sim 0.14 M_e$) and the ratio of integrated intensities of the electronic and vibrational photoinduced absorptions (Ie/Ip $\sim 560$), $M_{pol}$ is calculated to be $\approx 56 M_e$, as a lower limit for the polaron mass of emeraldine base.

This large value for the polaron mass is consistent with the low mobility of photoexcited polarons in emeraldine base. These results indicate the loss in symmetry in emeraldine base upon doping and photoexcitation. Long time dynamics at low temperatures are associated with hindered ring flipping as the result of the photoinduced transitions and the large polaron masses.

Figure 4:
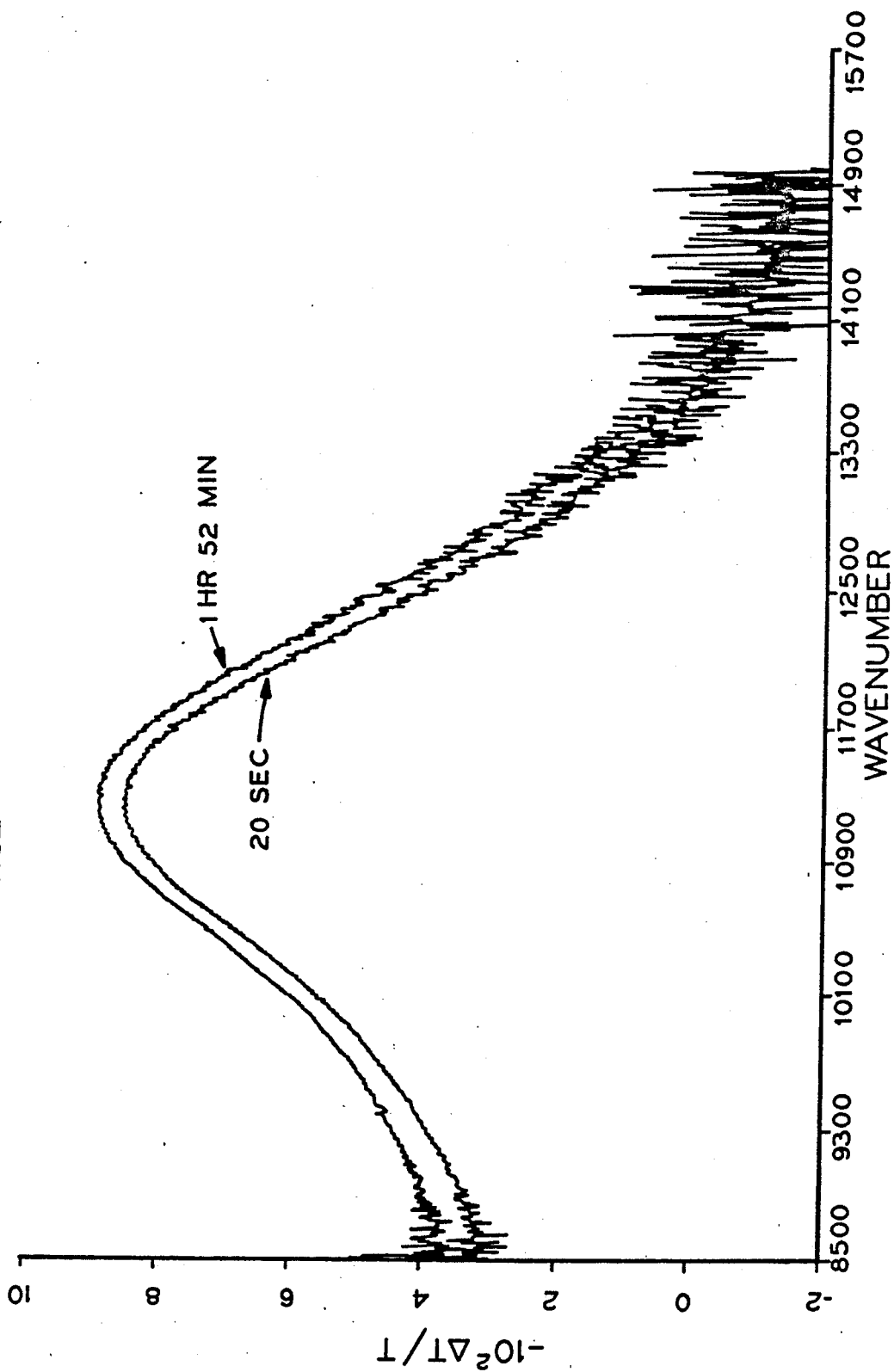
FIG. 4 shows the percent change in transmission of emeraldine base held at 80 K. at two different times after laser excitation at 488 nm.
Figure 5:
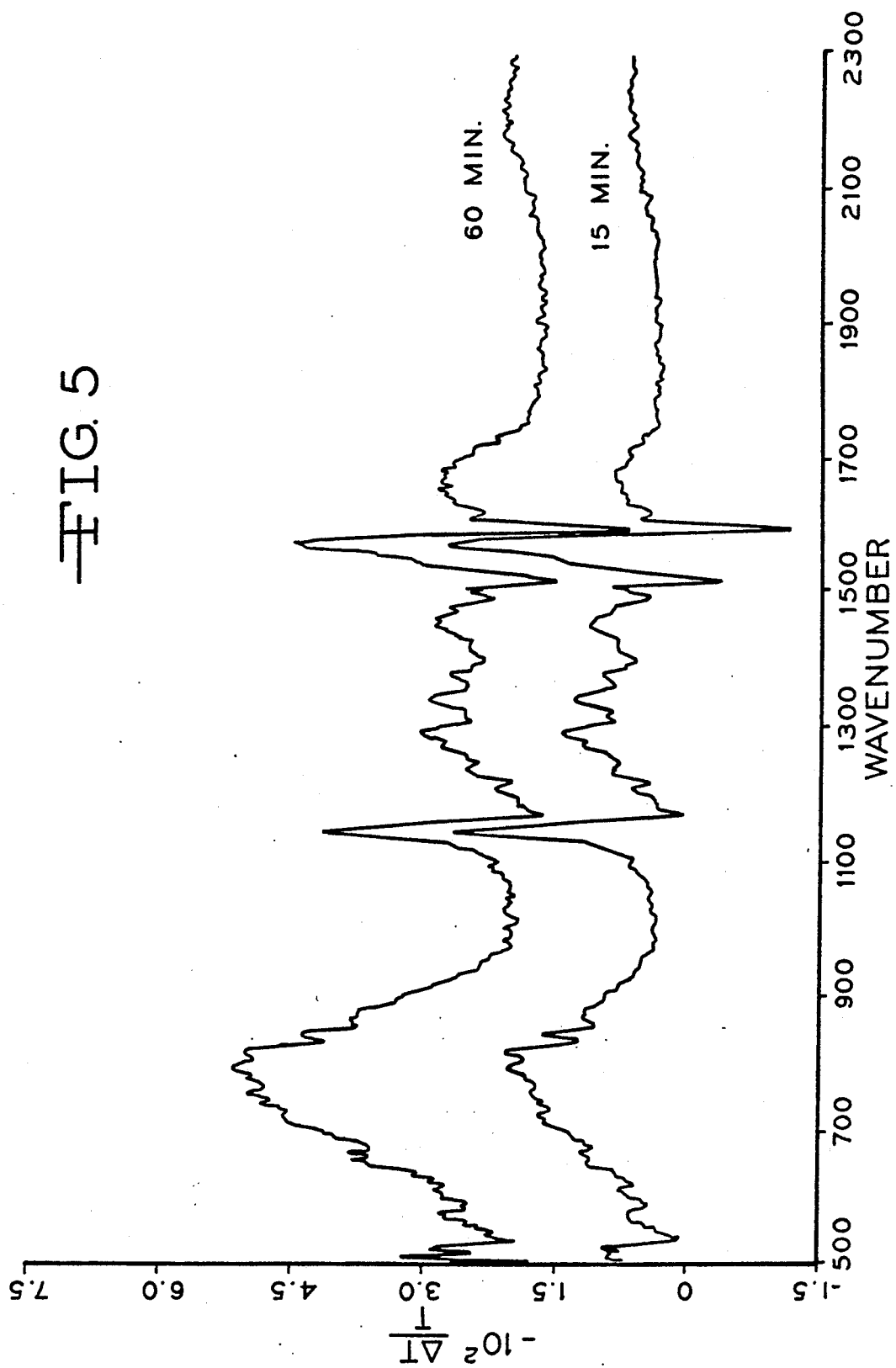
FIG. 5 shows the percent change in transmission of emeraldine base, in the mid infrared region, at two different times after laser excitation.

In application, the optical absorption characteristics of an insulating form of the polyaniline class of polymers can be knowingly shifted to that of a metallic form of the same polyaniline polymer upon application of specified optical inputs. This shift or photoabsorption spectrum results in part, from the formation of excitons and massive polarons, the recombination of which is hindered by inhibited ring flipping. Referring to FIGS. 4 and 5, it can be seen that the shifted photoabsoption spectrum is maintained with negligible decay at 80 K. for extended periods of time. FIG. 4 shows the change in transmission characteristics of emeraldine base at two different times after laser excitation. The two plots are offset by ¼ inch for clarity and it can be seen that, over an approximate two hour period there has been virtually no decay of the transmission charge of the emeraldine base. FIG. 5 shows a similar comparison as that of FIG. 4, only that the transmission charges are measured in the infrared range. The plots are offset by approximately one inch. It again can be seen that there is virtually no decay of the transmission characteristics.

The ability to permanently alter at will the absorption characteristics of polyaniline through the application of light or electrochemical potential provides a powerful technology for use in information storage. For instance, the focused writing beam of a low power helium neon laser operating at 632.8 nm may be used to write information on a thin (less than 1 micron) emeraldine base film, thereby inducing a large increase in the optical absorption in the near infrared spectral region that can be read conveniently by an inexpensive compact semiconductor diode laser operating at 800 nm, 1300 nm, or 1500 nm.

Figure 6:
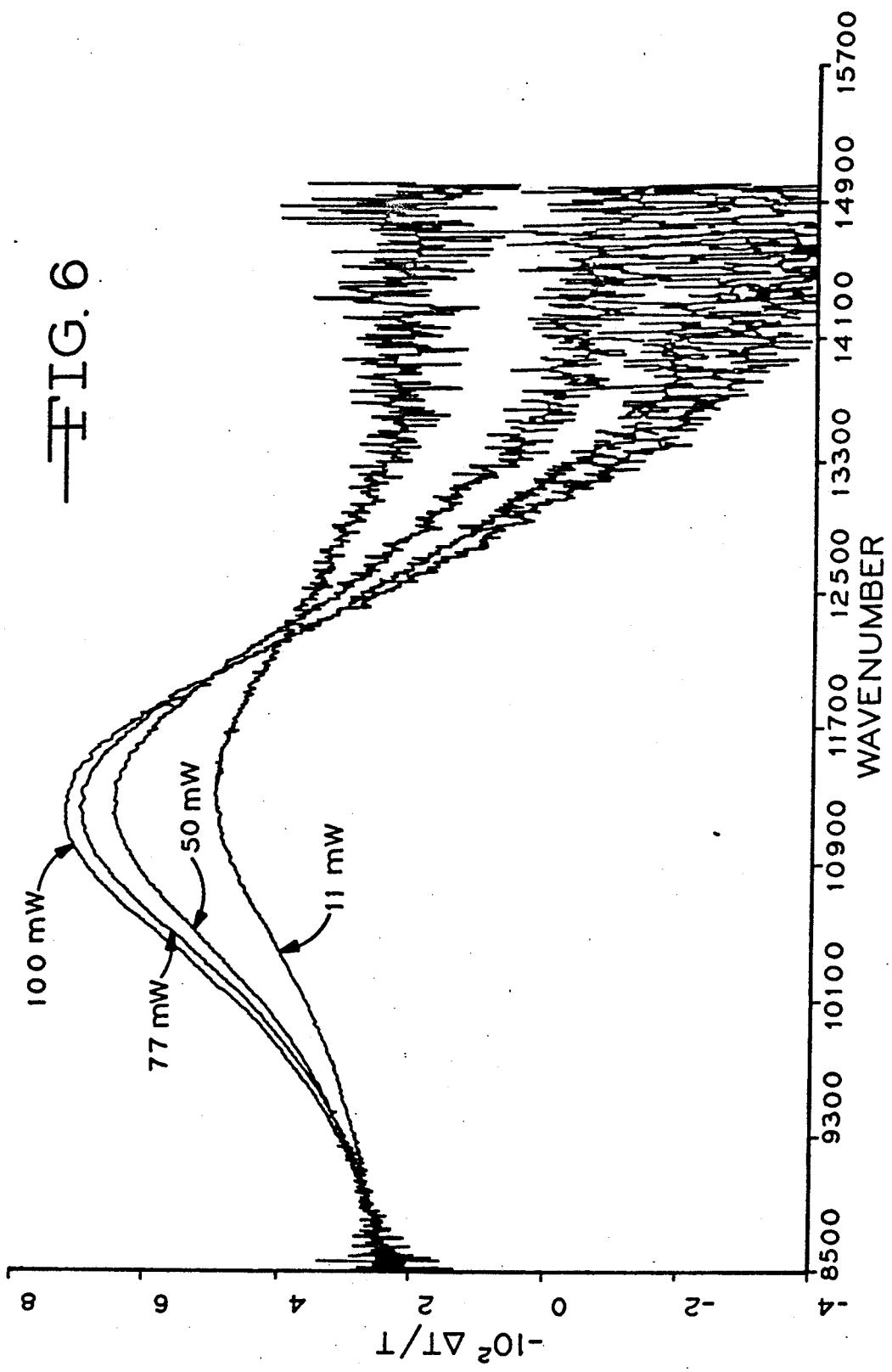
FIG. 6 shows the percent change in transmission of emeraldine base, in the near infrared range, that occurs for different laser excitation intensities.
Figure 7:
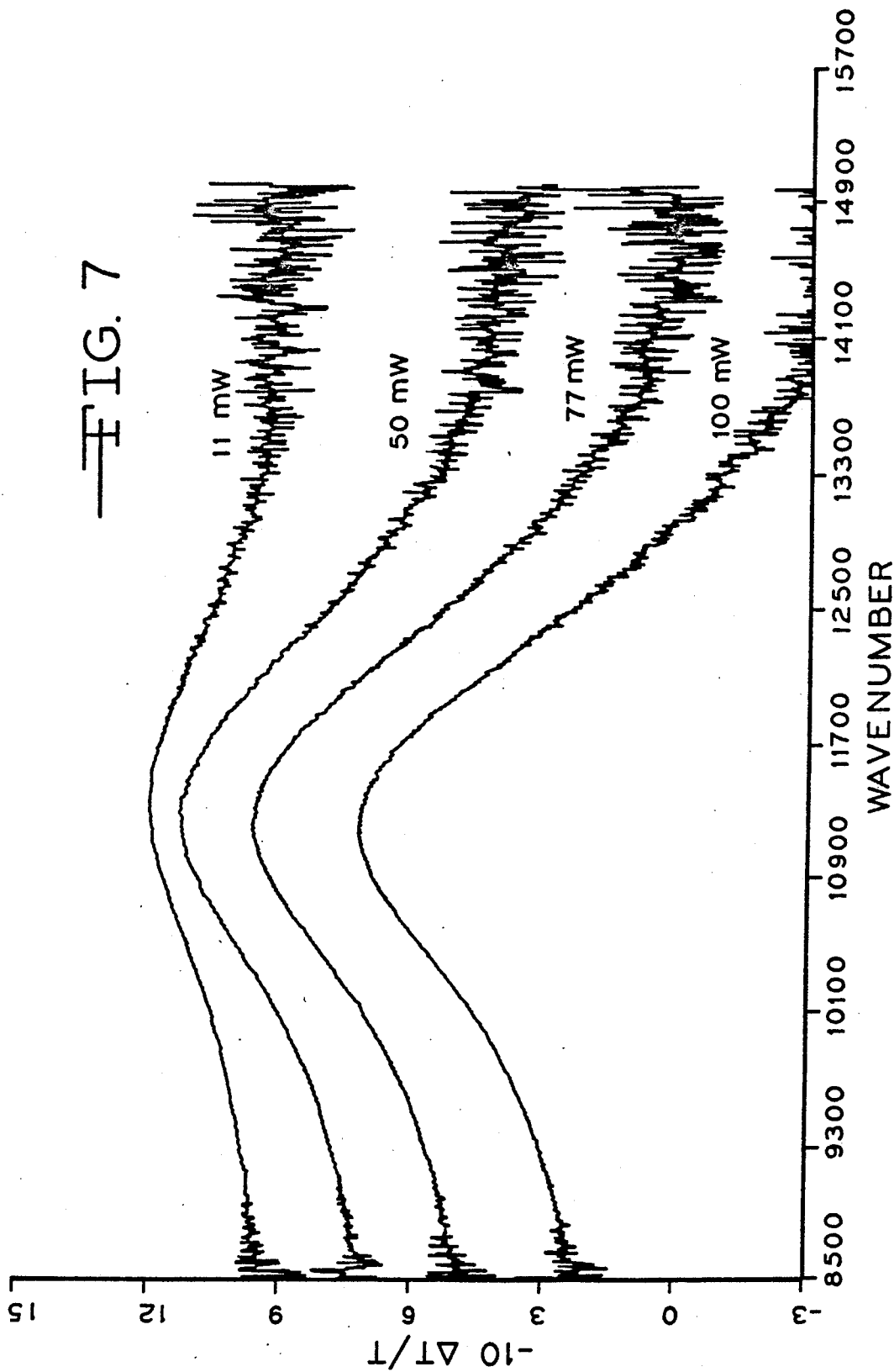
FIG. 7 is the same as FIG. 6 with the individual plots offset by $$-\frac{\Delta T}{T} = 0.024.$$
Figure 8:
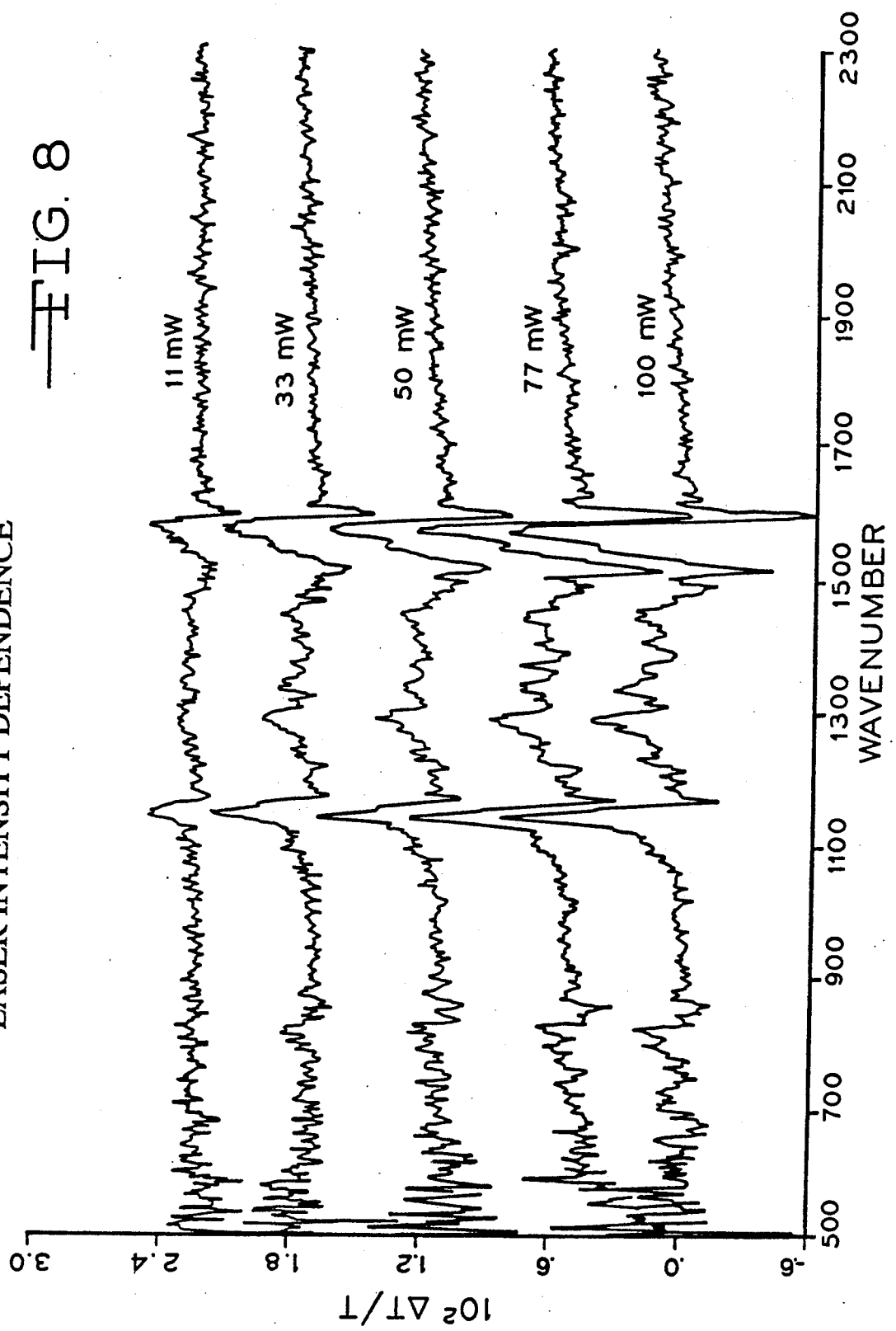
FIG. 8 shows the percent change in transmission of emeraldine base that occurs for different laser excitation intensities in the mid infrared range with the plots offset by $$-\frac{\Delta T}{T} = 0.0048.$$

Referring now to FIGS. 6, 7 and 8, transmission characteristics of the photoinduced absorption in emeraldine base are also dependent upon the writing laser input intensity. That is, the amount of photoinduced absorption is proportional to the intensity of the writing laser. This ability to "stack" the transmission characteristics of the shifted photoabsoption spectrum of polyaniline provides the capability to "stack" information storage at one given bit location on a storage unit. Thus, the read lasers can be utilized to correspond to the laser input intensity to read three-dimensionally at one bit location of the storage system.

Figure 12:
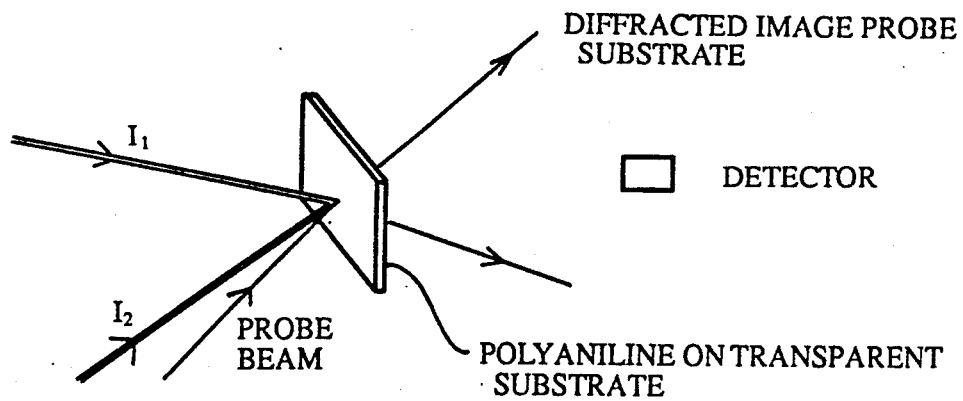
FIG. 12 is a schematic illustration of the use of polyaniline film in holographic and photoinduced grating applications.

Referring now to FIG. 12, a schematic representation of the use of polyaniline film to produce holographic images and photoinduced grating in a two-dimensional framework is shown. The two-dimensional framework is the sample configuration of a polyaniline film supported by a transparent substrate Two beams $I_1$ and $I_2$ interfere in the polyaniline film. For example, utilizing emeraldine base, beams $I_1$ and $I_2$ are focused low power Helium-Neon laser beams operating at 632.8 nm. The interference of $I_1$ and $I_2$ results in an interference pattern or holographic image within the emeraldine base polymer. This interference or holographic image is then read conveniently by inexpensive, compact, semiconductor diode lasers operating at 800 nm, 1300 nm or 1550 nm.

Figure 13:
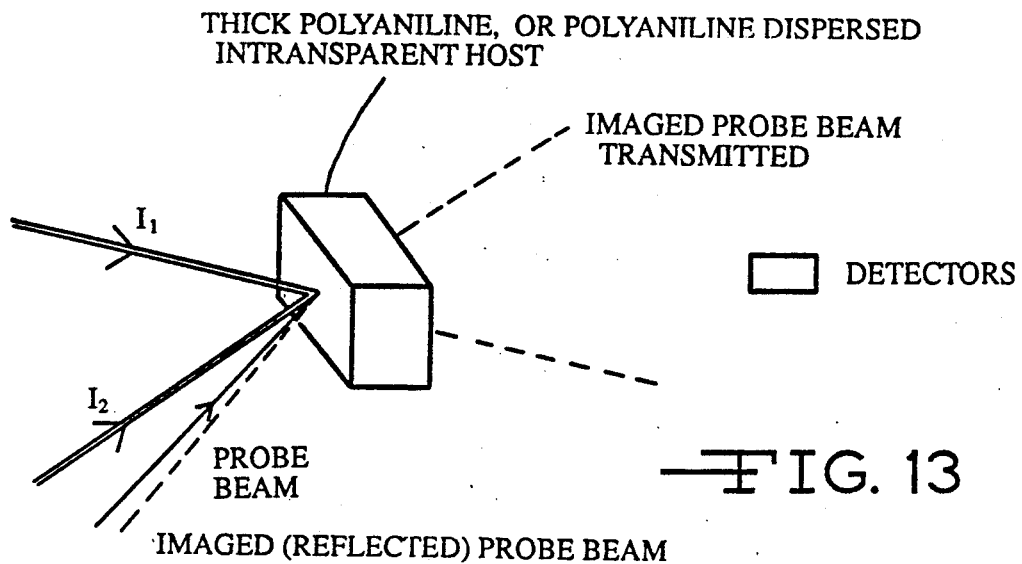
FIG. 13 is a schematic illustration of the use of a thick sample of polyaniline or polyaniline dispersed in a transparent host polymer in three-dimensional holographic and photoinduced grating applications.

FIG. 13 shows a three-dimensional holographic and photoinduced grating application by schematic illustration. A thick sample of polyaniline or polyaniline dispersed in a transparent host polymer such as kapton or polycarbonate is used. In this illustration two beams, $I_1$ and $I_2$, interfere in the polyaniline film, for example, utilizing emeraldine base, beams $I_1$ and $I_2$ are focused low power He-Ne laser beams operating at 632.8 nm. The interference of $I_1$ and $I_2$ results in an interference pattern or holographic image within the emeraldine base polymer. This interference or holographic image can be read conveniently by inexpensive, compact, semiconductor diode lasers operating at 800 nm, 1300 nm or 1550 nm.

Note that polyaniline for use in photorefractive applications as envisioned in either FIGS. 12 or 13 has an advantage over usual photorefractive materials such as $Bi_{12}SiO_{20}$ crystals in that the latter systems require applications of high voltage ($\sim 6$ kV cm$^{-1}$) to the photorefractive material to maintain the photoinduced grating or holographic image. The polyaniline material, because of the different microscopic mechanism involved, does not require the application of voltage to produce this high electric field, with concomitant advantages in design simplification, fabrication and processing simplification, and cost reduction.

Figure 9:
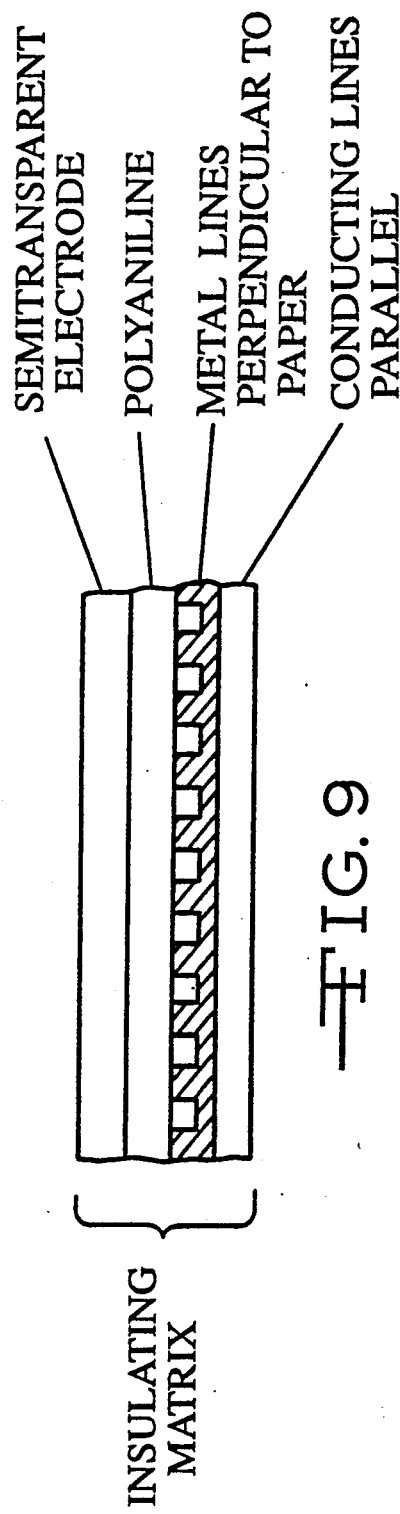
FIG. 9 is a schematic illustration of a configuration for use in the present invention for electrochemical bit-wise write or erasure of stored information.
Figure 10:
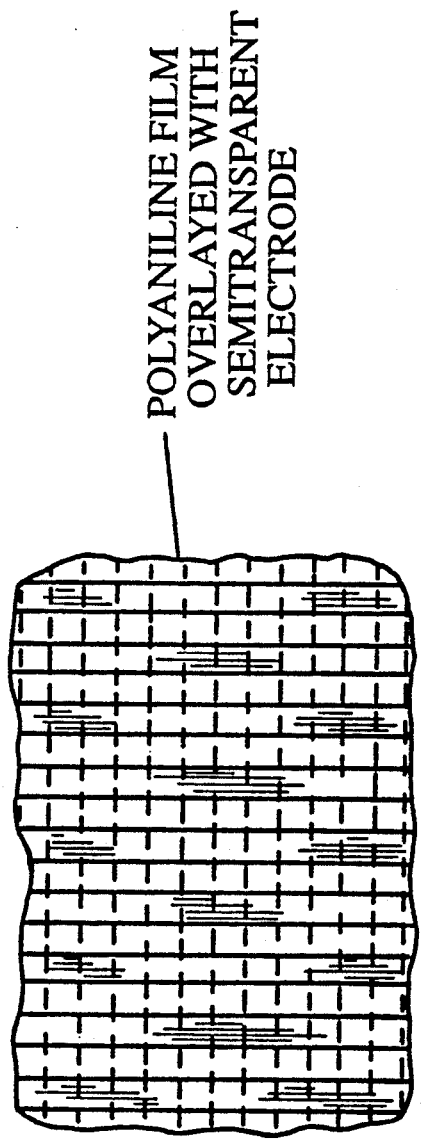
FIG. 10 is a top view of the schematic illustration of FIG. 9.

Chemical or electrochemical erasure of the stored information in a total or bit-wise manner is possible by temporary conversion of the conducting form of the polyaniline film. Electrochemical conversion is achieved in a compact solid-state sandwich cell such as shown in FIG. 9 and FIG. 10. The sandwich cell incorporates a solid electrolyte such as polyethyleneoxide and at least one transparent or semi-transparent electrode. The electrochemical electrodes are arranged in two overlaid but electrically isolated raster-like arrays. Applying voltage to two electrically conducting strips that cross at bit element P would produce a large enough voltage to switch the spectral state of the polymer at that bit element P. Application of a voltage at only one such strip would be insufficient to switch the bit. In addition to enabling the electrical erasure or correction of individual bits written optically this also allows the use of electrical bit data to write to the polymer and subsequently bring rapid optical read of the stored information.

It is noted that the temperature for erase of the photoinduced-information is controllable by judicious choice of the N or ring substituent. For example, use of polyortho-toluidine and naphthal versions in the emeraldine equivalent oxidations state will provide stability to higher temperatures, likely exceeding room temperature. Hence, some of these derivative systems will be usable at room temperature, with erase occurring above room temperature.

The polyaniline medium used for information storage may also be combined in composite form with other polymers to blend mechanical and optical storage function. The density of optical storage is limited only by the diffraction limits of the writing and probing beams utilized. Assuming a wavelength of 500 nm ultimately of bit density of approximately 1 bit per 1 micron by 1 micron square or approximately $7.3 \times 10^{10}$ bit per 12 inch disk is obtainable. Use of a shorter wavelength light or finer focusing technique leads to an even higher density of optical storage. This is 1000 times the information density available in current commercial sold technologies. This estimate is obtained assuming that each bit is either "on" (1, photoinduced absorption is present) or "off" (0, no photoinduced absorption present). By discriminating two levels of photoinduced absorption (reading each bit as 0, 1, 2) a density of $(7.3 \times 10^{10})^2$ bits per 12 inch disk or $5.3 \times 10^{21}$ bits per 12 inch disk is obtainable. Discriminating $n$ levels among the photoinduced absorption, raises the total number of information bits available to the $n^{th}$ power.

Figure 11:
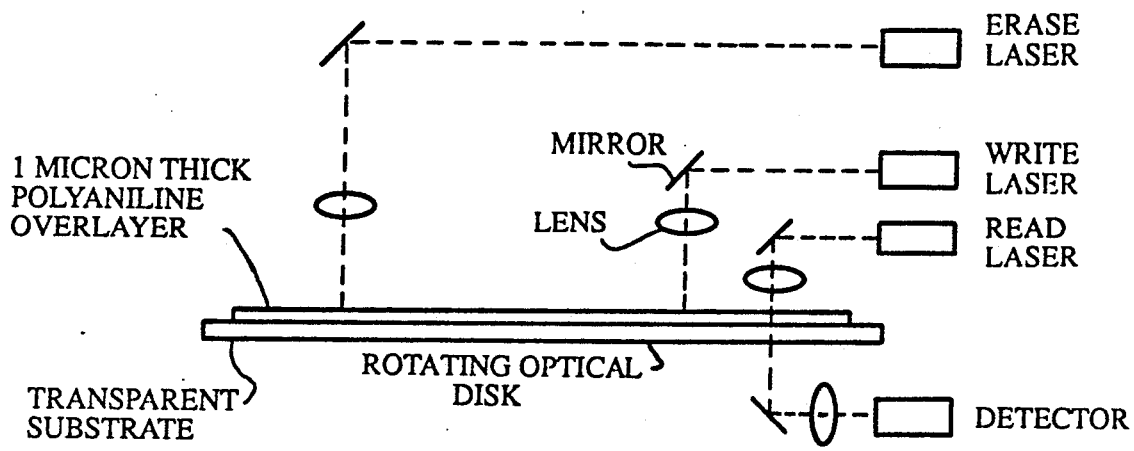
FIG. 11 is a side view of a schematic illustration of a polyaniline containing optical disk device of the present invention incorporating a rotating optical disk, laser and mirror for writing bits of information, and laser and mirror for reading the photoinduced information.

Referring now to FIG. 11, a schematic illustration of polyaniline containing an optical disk device incorporating a rotating optical disk, laser and mirror for writing bits of information, and laser and mirror for reading the photoinduced information. A third laser (shown) and mirror may be added for bit-wise erasure purposes. It is noted that these mirrors may be replaced by self-focusing lenses, rotating polygon mirrors, or other available devices for directing the light emitting from these lasers to the desired bit track on the rotating disk. The detector moves in a coordinated fashion to lie under the bit being probed or alternatively the collection optics (including mirrors, etc.) track the bit being selected and guide the collective light to the detector. The output of the detector is discriminated to distinguish more than one level of information stored within the bit location.

The multi-level information storage aspect of the present invention can be alternatively achieved through the use of an optical disk having two oriented films of polyaniline held at 90° relative orientation. Write, read, and erase light beams polarized parallel to the orientation direction of the top layer will record, read, and erase information on the top layer; light polarized parallel to the orientation direction of the bottom layer will be transmitted through the top layer and will record, read, and eraser the bottom layer.

The above description of the preferred embodiment of the present invention is intended to be limited for the purpose of producing clarity in the description. This description is not intended to be limiting upon the scope and content of the following claims.

We claim:

1. A process for the storage and retrieval of information in an optical high density erasable format comprising the steps of:

maintaining a storage unit composed in part of a film of the polyaniline class of polymers at a temperature at or below 100 Kelvin;

exposing such storage unit to a writing beam representative of such information or data, such writing beam having a known photon frequency and intensity to modify the optical absorption characteristics of such polyaniline film; and, exposing such storage unit to a reading beam having a second known photon frequency and intensity, said second known frequency and intensity being predetermined to match the altered optical absorption spectrum of such film, whereby such information or data is retrieved from said altered optical absorption spectrum.

2. The process of claim 1 further including the step of erasing such data stored by said writing beam input by elevating the temperature of such storage unit to room temperature.

3. The process of claim 1 further including the step of erasing such data stored by said writing beam input by selected bits by temporarily elevating the temperature of such selected bit of such storage unit to room temperature.

4. The process of claim 1 further including the step of erasing such data stored by said writing beam input by exposing such storage unit to an intense light source of selected wavelength.

5. The process of claim 1 further including the step of erasing such data stored by said writing beam input by selected bits by exposure of the selected bits of such storage unit to an intense directed light beam of selected wavelength.

6. The process of claim 1 further including the step of stacking such information or data stored by such writing beam by selectively altering the intensity of such writing beam, wherein the intensity of such modification of such optical absorption characteristics of such polyaniline film is directly responsive to such intensity of such writing beam, thereby enabling more than one bit of information to be written at a selected site on such storage unit.

7. The process of claim 1 wherein such writing beam is a focused beam produced by a Helium Neon laser operating at 632.8 nm, such storage unit includes in part a 1 micron or less thin film composed of the emeraldine base form of polyaniline, and the reading beam is produced by a semiconductor diode laser operating at either 800 nm, or 1500 nm.

8. A process for the storage and retrieval of data or information in an optical high density erasable format comprising the steps of:
providing a storage unit composed in part of a film of a polyorthotoluidine and napthal version of the emeraldine form of polyaniline;
exposing such storage unit to a writing beam representative of such information or data, such writing beam having a known photon frequency and intensity to modify the optical absorption characteristics of such polyaniline film; and,
exposing such storage unit to a reading beam having a second known photon frequency and intensity, said second known frequency and intensity being predetermined to match the altered optical absorption spectrum of such film whereby such information or data is retrieved from said altered optical absorption spectrum.

9. The process of claim 8 further including the step of erasing such data stored by such writing beam input by exposing such storage unit to a temperature elevated distinctly above room temperature.

10. A process for the storage and retrieval of data or information in an optical high density erasable format comprising the steps of:
providing a storage unit composed in part of a film of polyaniline or derivatized polyaniline composed of the formulation

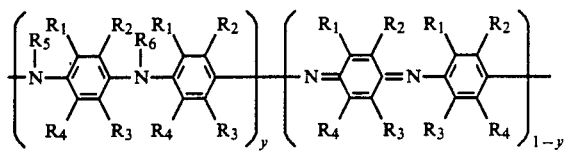

where $R_1$, $R_2$, $R_3$, $R_4$, $R_5$ and/or $R_6$ are taken from the group of H, $CH_3$, $C_2H_5$, $SO_3H$, and COOH and the compostion varies between 0.0 and 1.0;
exposing such storage unit to a writing beam representative of such information or data, such writing beam having a known photon frequency and intensity to modify the optical absorption characteristics of such polyaniline film; and,
exposing such storage unit to a reading beam having a second known photon frequency and intensity, said second known frequency and intensity being predetermined to match the altered optical absorption spectrum of such film whereby such information or data is retrieved from said altered optical absorption spectrum.

11. The process of claim 10 further including the step of erasing such data stored by such writing beam input by exposing such storage unit to a temperature elevated distinctly above room temperature.

12. The process of claim 10 wherein $R_1=CH_3$, $R_2=R_3=R_4=R_5=R_6=$ H and $Y \sim 0.5$ and maintaining such storage unit at a temperature not exceeding 200 K.

13. The process of claim 12 further including the step of erasing such data stored by said writing beam input by exposing such storage unit to a temperature elevated distinctly above 200 K.

14. The process of claim 10 wherein one or more of $R_i$ are provided with long or bulky substituents including asymmetric substituents placed about the rings of such polyaniline.

15. The process of claim 14 further including the step of erasing such data stored by said writing beam input by exposing such storage unit to a temperature elevated distinctly above room temperature.

* * * * *